Oct. 8, 1963　　　A. V. HOSE　　　3,106,220
CHECK VALVE WITH DASHPOT
Filed Sept. 13, 1961　　　　　　　　　　　　3 Sheets-Sheet 1

INVENTOR.
ALEXANDER V. HOSE
BY
ATTORNEYS

INVENTOR.
ALEXANDER V. HOSE
BY
Kenway, Jenney & Hildreth
ATTORNEYS

Oct. 8, 1963 A. V. HOSE 3,106,220
CHECK VALVE WITH DASHPOT
Filed Sept. 13, 1961 3 Sheets-Sheet 3

*INVENTOR.*
ALEXANDER V. HOSE
BY
*Kenway, Jenney & Hildreth*
ATTORNEYS

United States Patent Office 3,106,220
Patented Oct. 8, 1963

3,106,220
CHECK VALVE, WITH DASHPOT
Alexander V. Hose, Marblehead, Mass., assignor to Atwood & Morrill Co., Salem, Mass., a corporation of Massachusetts
Filed Sept. 13, 1961, Ser. No. 137,846
2 Claims. (Cl. 137—514)

This invention relates to fluid flow control valves, and more particularly, to a novel and improved one-way check valve.

One-way check valves are, of course, well known in the art. The main function of such a valve is to permit a flow of fluid in one direction and to prevent a back flow of fluid in the opposite direction. An illustrative application of such a valve is in the feed water supply system for a boiler. In a boiler feed water supply system, a check valve might be included in the input line to the boiler and on the downstream side of the boiler feed water pump. Inasmuch as the pump would not normally be continuously operative, the check valve would serve to permit a free flow of water in one direction to the boiler, and when the pump ceased operation the check valve would be intended to prevent a back flow of water from the boiler. One of the problems encountered with check valves in such an installation is water hammer. In certain installations, this effect may be so pronounced as to cause physical damage to the installation. It has been found that in a pressurized fluid supply system wherein a check valve is downstream of a pump which is providing fluid to a closed system, water hammer may be materially reduced if the check valve is closed substantially immediately upon cessation of pump operation.

It is a primary object of the present invention to provide a novel and improved check valve which will permit free flow of fluid in one direction and which will provide improved rapidity of closing to prevent back flow of fluid.

It is a further object of the present invention to provide a novel and improved check valve particularly adapted for use in a pressurized fluid supply system which includes a motor driven pump with the valve providing unrestricted flow in one direction during operation of the pump and providing quick closing immediately upon cessation of pump operation.

Other objects with be in part obvious, and in part pointed out more in detail hereinafter.

The invention accordingly consists in the features of construction, combination of elements and arrangement of parts which will be exemplified in the construction hereafter set forth and the scope of the application of which will be indicated in the appeneded claims.

Figure 1:
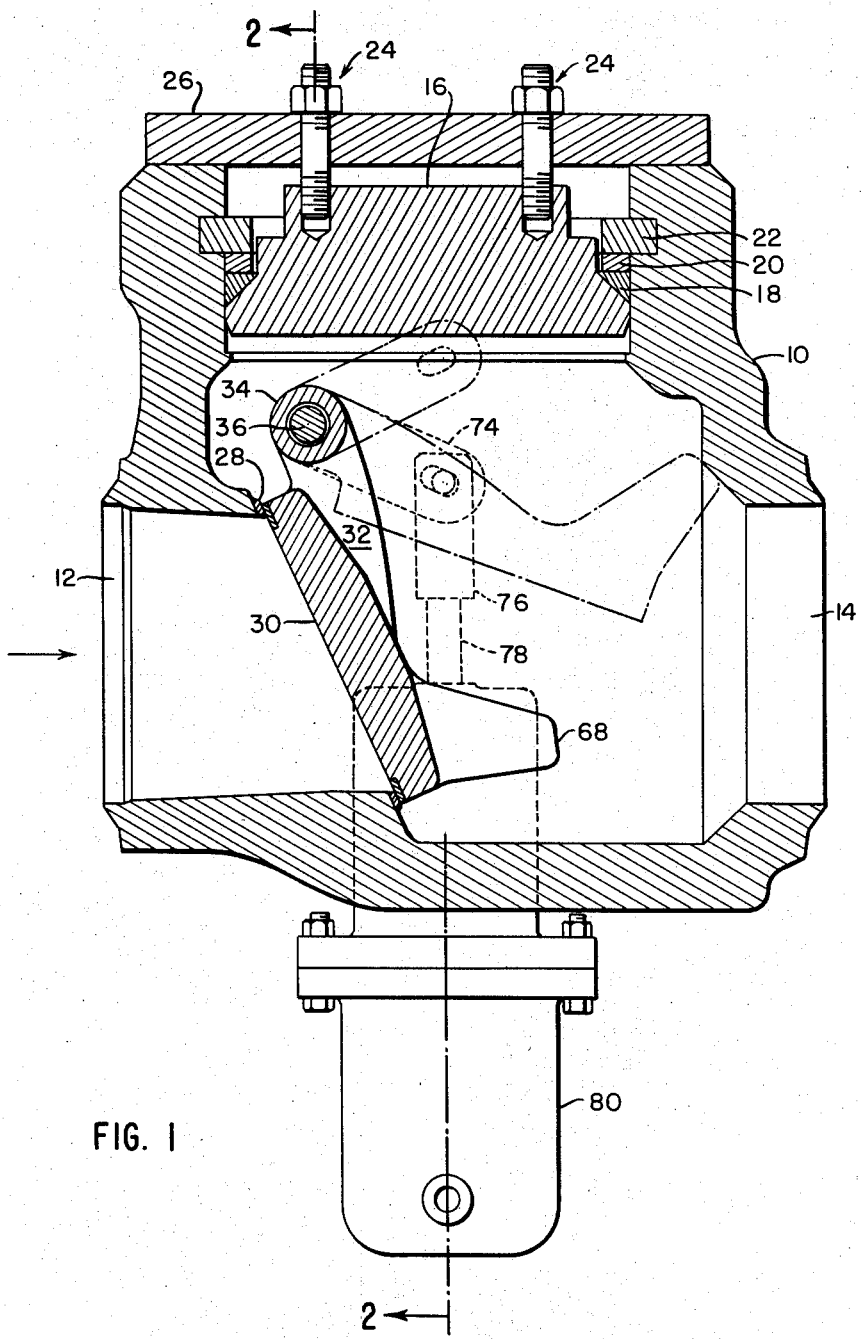
FIG. 1 is a cross sectional view of a check valve constructed in accordance with the present invention.

With reference to the drawing, and particularly FIGS. 1 to 4, a valve incorporating the present invention comprises a housing or body 10 having fluid flow inlet 12 and a generally aligned fluid flow outlet 14. The body is provided with a cover 16 received within an opening in the top of the body. The cover is sealed by an annular seal 18 pressed against the body and cover by an annular ring 20 which is engaged between the seal 18 and an annular key 22 which is engaged in an annular recess in the valve body. The cover is maintained in sealing engagement with the seal by a plurality of studs and bolts 24. The studs are threadably engaged in the cover and extend upwardly through a locking plate 26 with the bolts engaged with the top surface of the locking plate 26 to draw the cover into sealing engagement with the seal 18.

Figure 2:
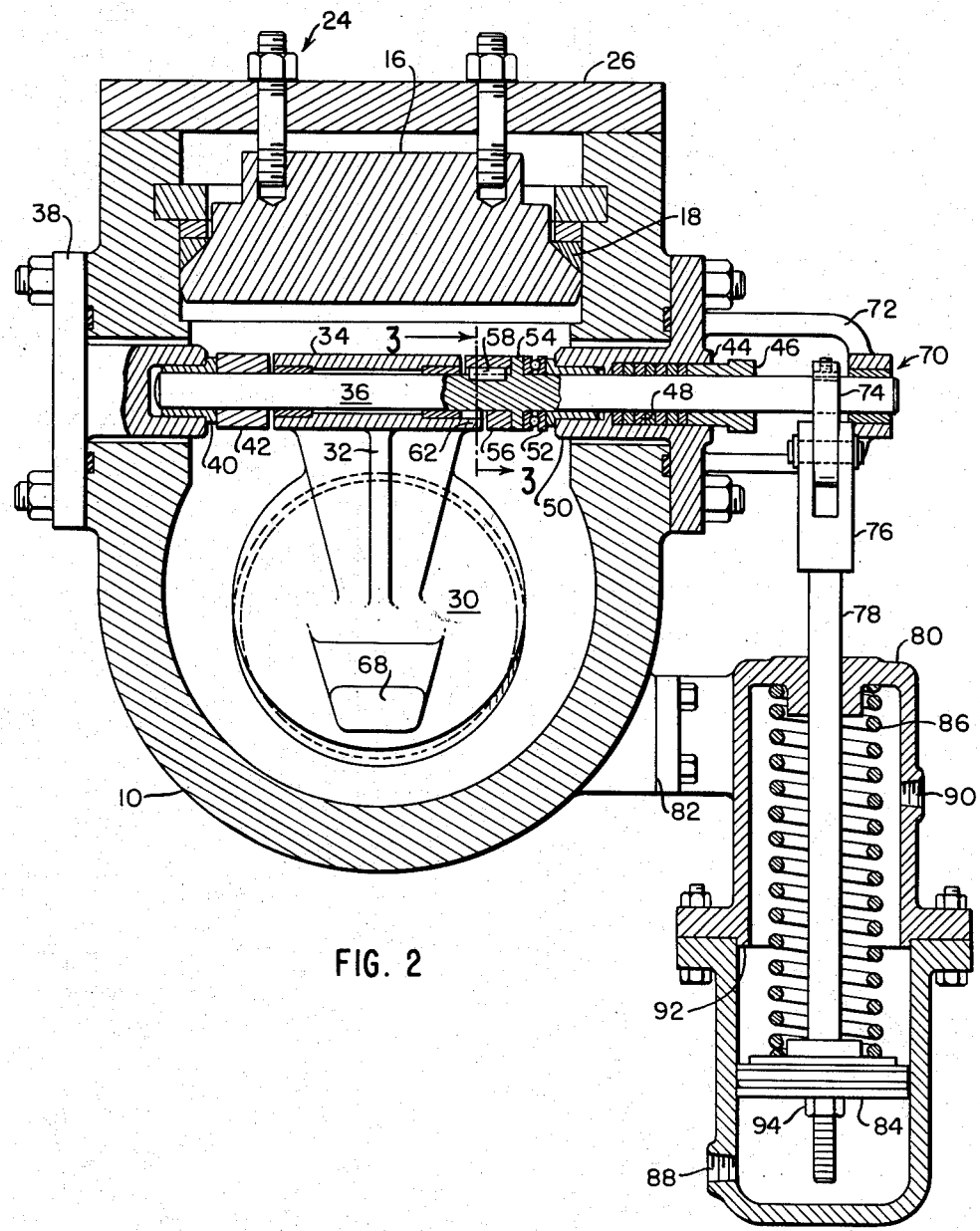
FIG. 2 is a cross sectional view substantially along the line 2—2 of FIG. 1.

As most clearly shown in FIG. 1, the valve body is provided with an inclined valve seat 28 which has an overlay of a suitable metal, such as stainless steel. Cooperating with the valve seat is a valve member or disc 30 which is provided with an annular facing of suitable metal, such as stainless steel, which is cooperably engageable with the overlay on the valve seat. The valve member 30 has a web portion 32 extending generally radially thereof and terminating in a sleeve 34. The sleeve 34 extends at right angles to the web 32 and is pivotally mounted on a shaft 36 extending coaxially within the sleeve. More specifically, the sleeve is provided with a pair of bushings inserted in the opposite ends thereof with the bushings slidably receiving the shaft 36. As shown in FIG. 2, the shaft 36 extends from the opposite ends of the sleeve 34. The leftward end of the shaft, as viewed in FIG. 2, is journalled in a bearing cover 38 which is bolted to the side of the valve body 10 by a plurality of studs and bolts. The bearing cover includes a cylindrical portion extending inwardly of the housing and having recesses in which is received a bushing 40 which journals the leftward end of the shaft 36. A spacer 42 surrounds the shaft 36 and is disposed between the bushing 40 and the leftward end of the valve member 30 and sleeve 34, as viewed in FIG. 2.

Figure 3:
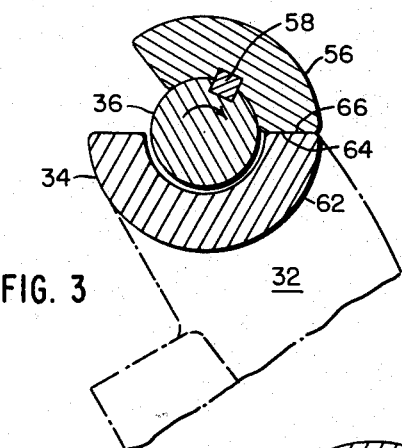
FIG. 3 is an enlarged cross sectional view substantially along the line 3—3 of FIG. 2.

The rightward end of the shaft 36, as shown in FIG. 2, is journalled in a stuffing box 44 which is bolted to the other side of the valve body by studs and bolts. The stuffing box includes a gland 46 and packing 48 to provide a seal around the shaft. The inner end of the stuffing box is provided with a bushing 50 which journals the shaft 36. The outer end of the bushing abuts a thrust bearing 52 the other side of which is engaged by an annular shoulder 54 on the shaft 36. On the other side of the shoulder 54 is a dog 56 having a cylindrical portion arranged over the shaft 36 and connected for movement with the shaft by a key 58. With reference to FIGS. 2 and 3, the dog is provided with an arcuate cross section portion extending from one end thereof toward the sleeve 34 in a direction parallel to the axis of the sleeve. The next adjacent end of the sleeve is cut back to provide a generally semi-annular projecting portion 62 at this end of the sleeve. As most clearly shown in FIG. 3, the projecting or driving portion of the dog 56 has a length circumferential of the shaft 36 which is less than the projecting or driven portion 62 of the sleeve 34. With the dog positioned angularly about the axis of the sleeve 34, as shown in FIG. 3, the sleeve will not be permitted to pivot about the shaft 36 due to the engagement of the opposing surfaces 64, 66 of the dog and sleeve, respectively. However, as will be more fully discussed, when the dog is moved into the position shown in FIG. 4, the valve member will be permitted free swinging movement about the axis of the shaft 36 to provide the normal operation of the one-way free swinging check valve. As shown in FIG. 1, the valve member is provided with a stop 68 which is engageable with the valve body to limit movement of the valve member in an opening direction during free swinging operation of the valve member.

With reference to FIG. 2, the rightward end of the shaft 36 projects outward beyond the stuffing box 44 and is journalled in a bearing 70 supported by a bracket 72 mounted on the valve body. As shown in FIGS. 1 and 2, a link 74 is connected at one end between the bearing 70 and stuffing box 44 for movement with the shaft 36. The other end of the link is provided with an elongated slot slidably receiving the pin of a clevis connector 76 which is mounted on the end of a piston rod 78 projecting from an air motor 80. The air motor 80 is supported on the valve body by a bracket 82. The air motor includes a piston 84 which is biased in a downward direction by a spring 86. The air motor also includes a pressure inlet 88 and a vent opening 90 disposed on opposite sides of the piston 84. The air motor, as shown in FIG. 2, is in the deenergized condition whereby the spring 86 urges the piston in a downward direction so as to tend to rotate the shaft 36 in a clockwise direction, as viewed in FIG. 3, so as to maintain the driving surface 66 of the dog 56 in engagement with the surface 64 of the sleeve 34 and thus maintain the valve member in closed position.

Figure 4:
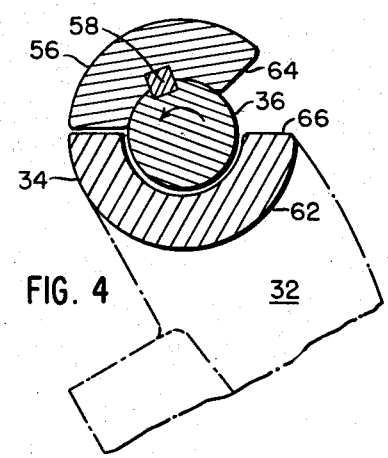
FIG. 4 is a cross sectional view similar to FIG. 3 illustrating the parts in a different operative position.

When the air motor is energized by the introduction of pressurized air into the inlet 88, the piston 84 will be forced upwardly against the spring to rotate the shaft 36 in a counter clockwise direction, as viewed in FIG. 4. This actuation of the air motor will effect rotation of the shaft 36 and thus the dog 56 in a counter clockwise direction, as viewed in FIG. 4, so as to space the surfaces 64 and 66 of the dog 56 of the sleeve 34, respectively. In this position of the dog, the valve member 32 will be free to pivot about the axis of the shaft 36 in response to changes in the valve in the direction of the arrow of FIG. 1. Thus, with the dog in the position in FIG. 4, the valve is conditioned to act as a free swinging check valve. The movement of the shaft 36 in a counter clockwise direction, as viewed in FIG. 4, is limited in order to preclude any movement of the valve member by the dog 56 in an opening direction. This limit on the movement of the shaft 36 is provided by a stop 92 formed by a shoulder within the body of the air motor 80 which is engageable with the piston 84 when the piston is moved upwardly, as shown in FIG. 2. Adjustment of the extent of movement of the shaft 36 is permitted by the adjustable mounting of the piston 84 on the piston rod 78. As shown in FIG. 2, a nut 94 is threadably engaged over the free end of the piston rod and is engageable with the piston longitudinally of the rod, whereby the piston may be adjustably positioned longitudinally of the rod 78.

In the normal operation of the valve, the air motor is energized to raise the piston and rotate the shaft 36 to position the dog 56 in the position shown in FIG. 4. As noted above, with the dog in this position, the valve member is free to pivot about the axis of the shaft 36 as a free swinging check valve member. When the air motor is deenergized, the spring 86 immediately urges the piston 84 downwardly to rotate the shaft 36 and position the dog 56 in the position shown in FIG. 3. Assuming that the valve is partly open when the air motor is deenergized, the dog will be rotated until it engages the sleeve 34 whereupon continued rotation of the dog will cause the valve member to be closed forceably. As long as the air motor remains deenergized, the valve member will remain positively closed and will prevent back flow through the valve. Thus, it will be seen that there has been provided a novel and improved free swinging check valve which includes provisions for positive closing of the valve member. This combination of features is accomplished through the lost motion driving connection provided between the dog 56 and sleeve 34 when the air motor is energized. The operation of the valve during positive closing is extremely rapid and assures that there will be no back flow through the valve presuming that the air motor is deenergized while the pressure differential across the valve is still in the positive direction.

Figure 6:
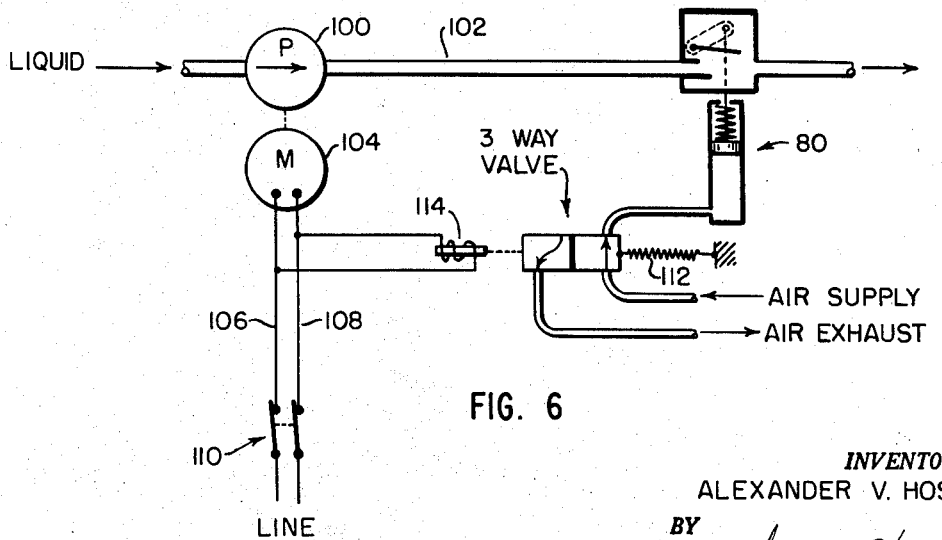
FIG. 6 is a schematic diagram of a boiler feed water pumping system incorporating the valve of the present invention.

As noted heretofore, the valve of this invention is particularly adapted for use in a pressurized water feed system such as a boiler feed water supply. With reference to FIG. 6, there is shown schematically, such a system in which the output of the pump 100 is connected to the valve by a line 102. The pump is driven by an electric motor 104. The motor 104 is energized through current carrying wires 106, 108 which are provided with a control switch 110. The air motor 80 for the valve is controlled by a three-way valve including means such as a compression spring 112 for normally positioning the valve to vent the air motor. A solenoid 114 is electrically connected to the lines 106, 108 and is mechanically connected to the three-way valve to condition the valve to energize the air motor when the solenoid is energized. As can be seen from FIG. 6, when the switch 110 is closed, the solenoid 114 will likewise be energized. Accordingly, the three-way valve will be positioned to energize the solenoid to position the dog 56 in the position shown in FIG. 4. The valve will then operate as a free swinging check valve.

When the switch 110 is opened to deenergize the motor 104, the solenoid 114 will also immediately be deenergized and the three-way valve will be shifted to deenergize the air motor whereby the dog 56 will be moved to the position shown in FIG. 3 with an attendant positive closing of the valve. From the above, it will be apparent that the valve will be closed substantially immediately upon deenergizing of the motor driving the pump 100. Accordingly, back flow through the valve will for all intents and purposes be eliminated. Further, water hammer in the conduits on the downstream side of the pump will be materially eliminated. For example, with the valve of the present invention in a system such as shown in FIG. 6, the water hammer was found to be practically inaudible when the valve was closed in the manner described. However, where the valve was permitted to be closed without the positive closing feature, in other words as a free swinging check valve, the water hammer was sufficient to cause a substantially positive slam and attendant vibration.

Figure 5:
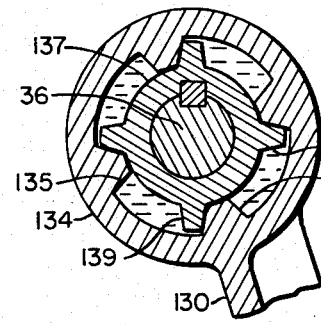
FIG. 5 is a cross sectional view of a modified construction of the portion of the valve shown in FIG. 3.

While not desirable in installations such as a boiler feed water supply system, it may at times be desirable to provide damping of the closing action of the valve member. As shown in FIG. 5, the valve member may be provided with a sleeve 134 arranged concentrically around the shaft 36 with a plurality of inwardly extending vanes 135. Mounted on the shaft 36 is a second sleeve 137 having a plurality of radially outwardly extending vanes 139. The vanes 139 serve the same function as the dog 56 previously described. More specifically, the sleeve 137 is keyed to the shaft 36 for rotation therewith. With the shaft in the angular position shown in FIG. 5, the valve member 130 is free to move in counter clockwise direction about the axis of the shaft 36 so as to operate as a free swinging check valve member. However, when the shaft 36 is rotated in a clockwise direction, the vanes 139 will engage the vanes 135 to effect positive closing of the valve member. As thus far described, the modification of the valve of FIG. 5 is generally similar in operation and structure to the principal embodiment of the valve previously described. However, the space between the sleeve 137 and sleeve 134 is filled with a liquid such as water. Clearance is provided between the tips of the vanes 135 and the outer cylindrical surface of the sleeve 137. If the valve member moves as a free swinging valve member, water will flow from one side of the vanes 135 to the other side thereof through the clearances provided between the vanes 135 and the sleeve 137. Free swinging valve member movement will normally be sufficiently slow so that there will be no damping provided by the water. On the other hand, when the shaft 36 and thus the sleeve 137 is moved rapidly upon deenergization of the air motor, the water will provide damping and thus dashpot control the speed of closing of the valve member. As will be apparent, the clearances between the various vanes and the sleeves may be varied to change the damping action provided. For example, the contour of the inner wall of the sleeve 134 might be varied so as to provide different clearances over different portions of the travel of the vanes 139. In this manner, an initially rapid closing followed by a subsequent slower closing might be accomplished.

As will be apparent, when the valve is provided with the modification of FIG. 5, the valve still retains the combination of features of a free swinging check valve and a positive closing valve. While at the same time any advantages of the damping action of the valve member, either when it is operating as a free swinging valve member or when it is positively closed, are included.

It will further be apparent to those skilled in the art that certain changes and modifications could be made in the structure described. For example, the valve could be constructed to provide positive closing of the valve member upon energizing rather than deenergizing of the air motor. Also, other suitable means could be provided for driving the valve member in a closing direction rather than the air motor specifically described. Inasmuch as these and other changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language in the following claims is intended to cover all of the generic and specific features of the invention herein described and all statements of the scope of the invention which, as a matter of language, might be said to fall therebetween.

Having thus described my invention, I claim:

1. In a fluid flow valve having a valve body and a valve seat; a rotatable shaft journalled on the valve body, a valve member cooperably engageable with said seat, a sleeve journalled on the shaft in sealed relation and supporting said valve member for pivotal movement about the shaft axis, the shaft having a plurality of radially outwardly extending angularly spaced vanes, the sleeve having a plurality of radially inwardly extending vanes disposed between the vanes on the shaft, and a liquid filling the space between the shaft and sleeve.

2. In a fluid flow valve having a valve body and a valve seat; a rotatable shaft journalled on the valve body, a valve member cooperably engageable with said seat, a sleeve journalled on the shaft in sealed relation and supporting said valve member for pivotal movement about the shaft axis, the shaft having a plurality of radially outwardly extending angularly spaced vanes, the sleeve having a plurality of radially inwardly extending vanes disposed between the vanes on the shaft, a liquid filling the space between shaft and sleeve, and means for rotating the shaft to provide initial yielding rotation of the sleeve and valve member by fluid coupling between the vanes of shaft and sleeve and positive actuation of the sleeve and valve member by engagement of the vanes on shaft and sleeve.

References Cited in the file of this patent

UNITED STATES PATENTS

| | | |
|---|---|---|
| 2,174,153 | Dorer | Sept. 26, 1939 |
| 2,251,414 | Neal | Aug. 5, 1941 |
| 2,504,006 | Davis | Apr. 11, 1950 |
| 2,573,297 | Atkinson | Oct. 30, 1951 |
| 2,800,921 | Wright | July 30, 1957 |